United States Patent
Itoh

(10) Patent No.: US 11,009,785 B2
(45) Date of Patent: May 18, 2021

(54) PROJECTOR

(71) Applicant: Seiko Epson Corporation, Tokyo (JP)

(72) Inventor: Yoshitaka Itoh, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/385,166

(22) Filed: Apr. 16, 2019

(65) Prior Publication Data

US 2019/0317391 A1    Oct. 17, 2019

(30) Foreign Application Priority Data

Apr. 17, 2018  (JP) .............. JP2018-078949

(51) Int. Cl.
    *G03B 21/20*    (2006.01)
    *G03B 21/00*    (2006.01)
    *H04N 9/31*     (2006.01)

(52) U.S. Cl.
    CPC ....... *G03B 21/2033* (2013.01); *G03B 21/006* (2013.01); *G03B 21/208* (2013.01); *G03B 21/2073* (2013.01); *H04N 9/3152* (2013.01); *H04N 9/3155* (2013.01)

(58) Field of Classification Search
    CPC .............. G03B 21/2033; G03B 21/006; G03B 21/2073; G03B 21/208; G03B 21/3152; G03B 21/3155; H04N 9/3152; H04N 9/3155
    USPC .......................................................... 353/31
    See application file for complete search history.

(56) References Cited

U.S. PATENT DOCUMENTS

| | | |
|---|---|---|
| 2004/0062044 A1 | 4/2004 | Hanano |
| 2006/0285086 A1 | 12/2006 | Hashimoto et al. |
| 2012/0218752 A1* | 8/2012 | Sumitani ............ F21V 11/14 |
| | | 362/235 |
| 2015/0261042 A1* | 9/2015 | Sugaya .......... G02F 1/133605 |
| | | 349/69 |

FOREIGN PATENT DOCUMENTS

| | | |
|---|---|---|
| JP | 2000-075406 A | 3/2000 |
| JP | 2006-318922 A | 11/2006 |
| JP | 2006-350171 A | 12/2006 |
| JP | 2007-059139 A | 3/2007 |
| JP | 2011-090334 A | 5/2011 |
| JP | 2013-011648 A | 1/2013 |

* cited by examiner

*Primary Examiner* — Jerry L Brooks
(74) *Attorney, Agent, or Firm* — Harness, Dickey & Pierce, P.L.C.

(57) ABSTRACT

A projector includes first through fourth light emitters defining a placement region for fifth light emitters. The placement region is rectangular defined by first through fourth sides. The light intensity of a sixth light emitter closest to the middle of the first side is smaller than the light intensities of the first and second light emitters. Fifth light emitters arranged in a first direction from the center of the first light emitter toward the middle of the first side have light intensities that decrease toward the positive side in the first direction between the first light emitter and the sixth light emitter, and fifth light emitters arranged in a second direction from the center of the second light emitter toward the middle of the first side have light intensities that decrease toward the positive side in the second direction between the second light emitter and the sixth light emitter.

9 Claims, 8 Drawing Sheets

PROJECTOR

The present application is based on, and claims priority from JP Application Serial Number 2018-078949, filed on Apr. 17, 2018, the disclosure of which is hereby incorporated by reference herein in its entirety.

BACKGROUND

1. Technical Field

The present disclosure relates to a projector.

2. Related Art

There has been an increasing need for a high-luminance, compact projector.

For example, JP-A-2000-75406 describes a projector including a light source having a phosphor layer and emitters that cause the phosphor layer to emit light and an image forming section and so configured to allow the entire projection screen to have uniform luminance by increasing the emitter arrangement density with distance to the periphery of the phosphor layer.

JP-A-2000-75406 is an example of the related art.

In the projector described above, it is desirable to efficiently illuminate the region where the image forming section (light modulator) displays an image.

SUMMARY

A projector according to an aspect of the present disclosure includes a light source having a placement surface on which a plurality of light emitters are placed, and a light modulator having a rectangular display region that modulates light outputted from the light source in accordance with image information. Out of the plurality of light emitters, a first light emitter, a second light emitter, a third light emitter, and a fourth light emitter define a placement region where a fifth light emitter out of the plurality of light emitters is placed. In a plan view viewed in a direction of a normal to the placement surface, the placement region is a rectangular region defined by a first side that connects a center of the first light emitter to a center of the second light emitter, a second side that connects the center of the second light emitter to a center of the third light emitter, a third side that connects the center of the third light emitter to a center of the fourth light emitter, and a fourth side that connects the center of the fourth light emitter to the center of the first light emitter. The fifth light emitter is formed of a plurality of fifth light emitters. Out of the plurality of fifth light emitters, intensity of light outputted from a sixth light emitter placed in a position closest to a middle point of the first side is smaller than intensity of light outputted from the first light emitter and intensity of light outputted from the second light emitter. Out of the plurality of fifth light emitters, the fifth light emitters arranged in a first direction extending from the center of the first light emitter toward the middle point of the first side output light having intensities that decrease with distance toward a positive side in the first direction between the first light emitter and the sixth light emitter. Out of the plurality of fifth light emitters, the fifth light emitters arranged in a second direction extending from the center of the second light emitter toward the middle point of the first side output light having intensities that decrease with distance toward a positive side in the second direction between the second light emitter and the sixth light emitter.

In the projector according to the aspect described above, out of the plurality of fifth light emitters, intensity of light outputted from a seventh light emitter placed in a position closest to a center of the placement region may be greater than the intensity of the light outputted from the sixth light emitter, and out of the plurality of fifth light emitters, the fifth light emitters arranged in a third direction extending from the middle point of the first side toward the center of the placement region may output light having intensities that increase with distance toward a positive side in the third direction between the sixth light emitter and the seventh light emitter.

In the projector according to the aspect described above, the intensity of the light outputted from the seventh light emitter may be smaller than the intensity of the light outputted from the first light emitter and the intensity of the light outputted from the second light emitter.

In the projector according to the aspect described above, the light emitters may each include one light emitting device.

In the projector according to the aspect described above, a shape of the light in the light incident surface on the display region may be closer to a rectangular shape than in a case of a light source in which a plurality of light emitting devices are arranged in a rectangular placement region and all the light emitting devices output light having a same intensity.

The projector according to the aspect described above, may further include a light guide element that guides the light outputted from the light source to the display region, and a shape of the light on a light incident surface of the light guide element may be closer to a rectangular shape than in a case of a light source in which a plurality of light emitting devices are arranged in a rectangular placement region and all the light emitting devices output light having a same intensity.

In the projector according to the aspect described above, the light emitters may each include one or more light emitting devices, the number of light emitting devices provided in the sixth light emitter may be smaller than the number of light emitting devices provided in the first light emitter and the number of light emitting devices provided in the second light emitter, and intensity of light outputted from each of the light emitting devices provided in the first light emitter, intensity of light outputted from each of the light emitting devices provided in the second light emitter, and intensity of light outputted from each of the light emitting devices provided in the sixth light emitter may be equal to one another.

In the projector according to the aspect described above, out of the plurality of fifth light emitters, intensity of light outputted from an eighth light emitter placed in a position closest to a middle point of the second side may be smaller than the intensity of the light outputted from the second light emitter and intensity of light outputted from the third light emitter, out of the plurality of fifth light emitters, the fifth light emitters arranged in a third direction extending from the center of the second light emitter toward the middle point of the second side may output light having intensities that decrease with distance toward a positive side in the third direction between the second light emitter and the eighth light emitter, and out of the plurality of fifth light emitters, the fifth light emitters arranged in a fourth direction extending from the center of the third light emitter toward the middle point of the second side may output light having intensities that decrease with distance toward a positive side in the fourth direction between the third light emitter and the eighth light emitter.

In the projector according to the aspect described above, out of the plurality of fifth light emitters, intensity of light outputted from a ninth light emitter placed in a position closest to a middle point of the third side may be smaller than the intensity of the light outputted from the third light emitter and intensity of light outputted from the fourth light emitter, out of the plurality of fifth light emitters, the fifth light emitters arranged in the second direction extending from the center of the third light emitter toward the middle point of the third side may output light having intensities that decrease with distance toward the positive side in the second direction between the third light emitter and the ninth light emitter, and out of the plurality of fifth light emitters, the fifth light emitters arranged in the first direction extending from the center of the fourth light emitter toward the middle point of the third side may output light having intensities that decrease with distance toward the positive side in the first direction between the fourth light emitter and the ninth light emitter.

In the projector according to the aspect described above, out of the plurality of fifth light emitters, intensity of light outputted from a tenth light emitter placed in a position closest to a middle point of the fourth side may be smaller than the intensity of the light outputted from the fourth light emitter and the intensity of the light outputted from the first light emitter, out of the plurality of fifth light emitters, the fifth light emitters arranged in the fourth direction extending from the center of the fourth light emitter toward the middle point of the fourth side may output light having intensities that decrease with distance toward the positive side in the fourth direction between the fourth light emitter and the tenth light emitter, and out of the plurality of fifth light emitters, the fifth light emitters arranged in the third direction extending from the center of the first light emitter toward the middle point of the fourth side may output light having intensities that decrease with distance toward the positive side in the third direction between the first light emitter and the tenth light emitter.

DESCRIPTION OF EXEMPLARY EMBODIMENTS

A preferable embodiment of the present disclosure will be described below in detail with reference to the drawings. It is not intended that the embodiment described below unduly limits the contents of the present disclosure set forth in the appended claims. Further, all configurations described below are not necessarily essential configuration requirements of the present disclosure.

1. Projector

Figure 1:
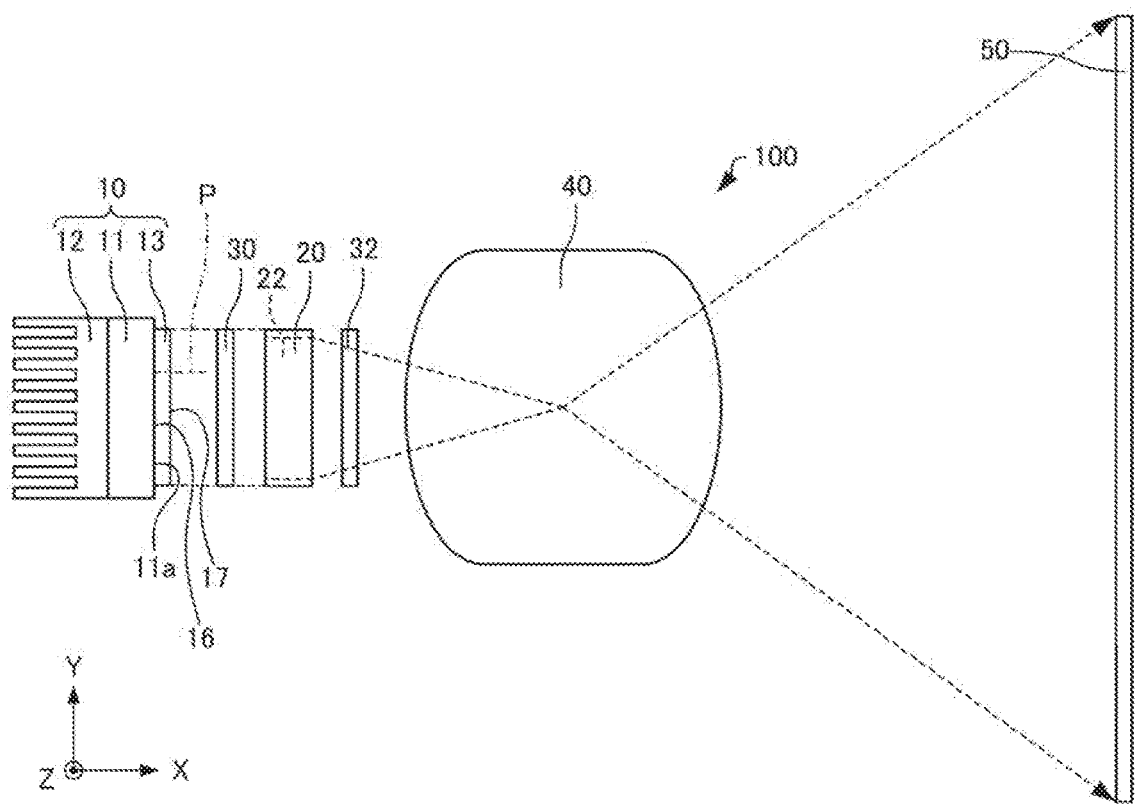
FIG. 1 diagrammatically shows a projector according to an embodiment of the present disclosure.

A projector according to an embodiment of the present disclosure will first be described with reference to the drawings. FIG. 1 diagrammatically shows a projector 100 according to the present embodiment. In FIG. 1 and FIGS. 2 to 6, which will be described later, axes X, Y, and Z are drawn as three axes perpendicular to one another.

The projector 100 includes, for example, a light source 10, a liquid crystal light valve (light modulator) 20, a first polarizer 30, a second polarizer 32, and a projection apparatus 40, as shown in FIG. 1.

Figure 2:
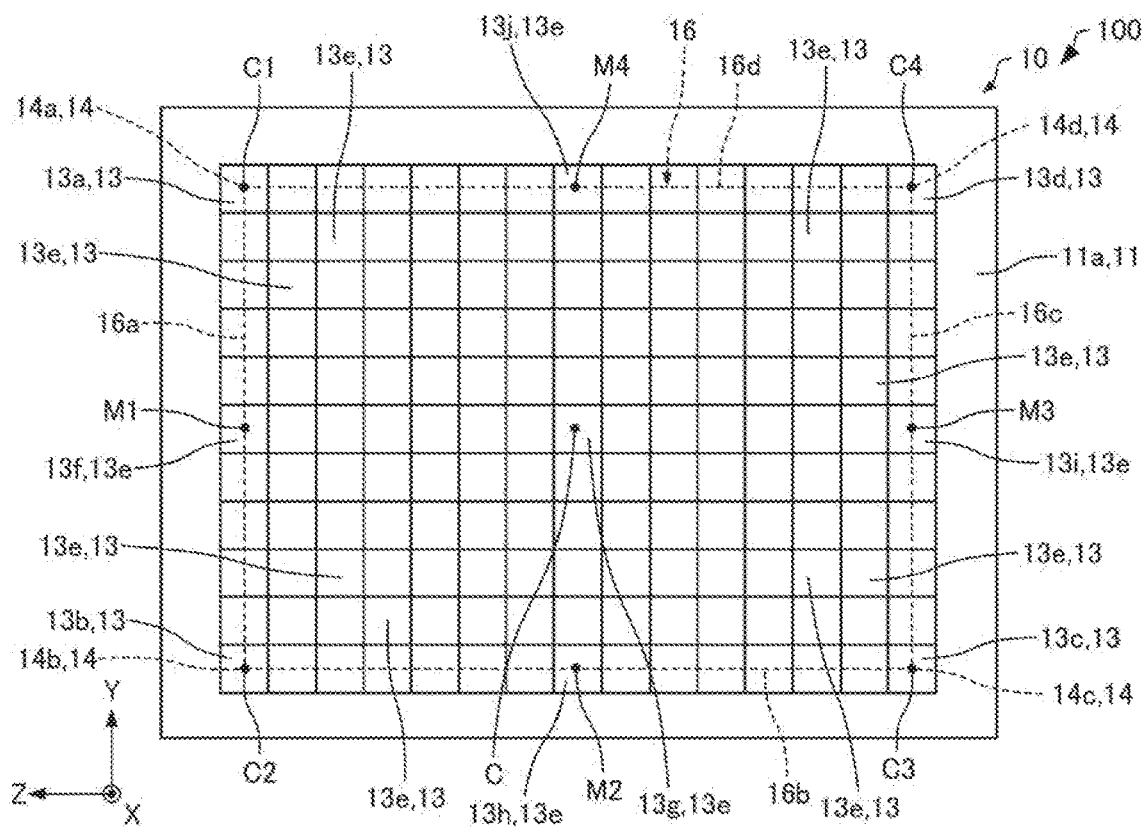
FIG. 2 is a plan view diagrammatically showing a light source of the projector according to the embodiment.
Figure 3:
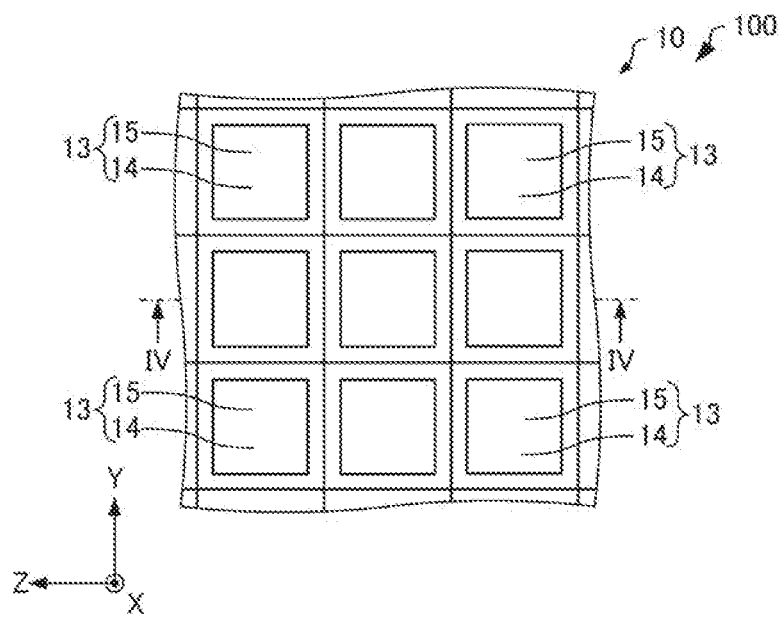
FIG. 3 is a plan view diagrammatically showing the light source of the projector according to the embodiment.
Figure 4:
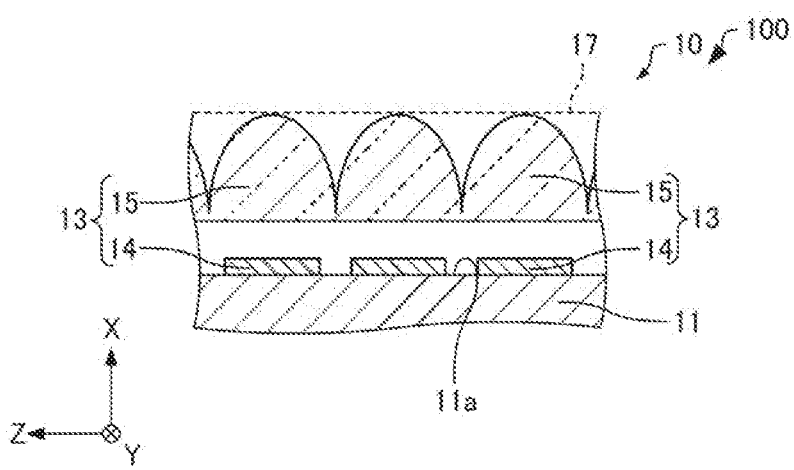
FIG. 4 is a cross-sectional view diagrammatically showing the light source of the projector according to the embodiment.

The light source 10 emits light. FIG. 2 is a plan view diagrammatically showing the light source 10. FIG. 3 is an enlarged view of FIG. 2 and diagrammatically shows the light source 10. FIG. 4 is a cross-sectional view taken along the line IV-IV in FIG. 3 and diagrammatically shows the light source 10. The light source 10 includes, for example, a substrate 11, a heat sink 12, and light emitters 13, as shown in FIGS. 1 to 4. In FIG. 1, the light emitters 13 are drawn in a simplified form for convenience.

The substrate 11 is, for example, a semiconductor substrate or an insulating substrate. The substrate 11 has a placement surface 11a, on which a plurality of light emitters 13 are placed. In the example shown in FIGS. 1 to 4, the placement surface 11a is a surface facing the +X-axis-direction side and has a normal P parallel to the axis X. The placement surface 11a has, for example, a rectangular shape.

The heat sink 12 is provided on a surface of the substrate 11 that is the surface opposite the placement surface 11a (the −X-axis-direction-side surface in the example shown in FIG.

1). The heat sink 12 is made, for example, of copper or aluminum. The heat sink 12 can dissipate heat generated by the light emitters 13.

The light emitters 13 are placed in a plurality of positions on the light source 10. The plurality of light emitters 13 are placed in a two-dimensional array (in a matrix), as shown in FIG. 2. The light emitters 13 each include a light emitting device 14 and a lens 15, as shown in FIGS. 3 and 4. In the example shown in FIGS. 3 and 4, the light emitters 13 each include only one light emitting device 14 and are each formed of one light emitting device 14 and one lens 15. The light source 10 has the function of individually controlling the intensity of the light emitted from each of the light emitting devices 14 (drive circuit that drives light emitting devices 14, for example). The example shown in FIGS. 3 and 4 shows a configuration in which one light emitting device 14 are provided with one lens 15.

The light emitting devices 14 are each a surface-emission light emitting device that outputs light (light flux) having a small divergence angle (narrow light orientation angular range). The light orientation distribution of the divergent light outputted from each of the light emitting devices 14 is, for example, axially symmetric with respect to the optical axis along which the light exits. The optical axis along which the light exits is, for example, parallel to the normal P.

The light emitting devices 14 are each, for example, an LED (light emitting diode), an EL (electronic luminescent) device, a VCSEL (vertical cavity surface emitting laser), or a nano-column light emitting device (nano-column LED, nano-column LD (laser diode)). A nano-column light emitting device, in particular, is preferably used as each of the light emitting devices 14 because a nano-column light emitting device has a nano-size pillar-shaped (columnar) crystal element, such as GaN, and can output light having a small divergence angle.

The light emission surface (light exiting surface through which light exits) of each of the light emitting devices 14 preferably has a shape that allows closest packed arrangement, for example, a rectangular shape but not necessarily. For example, the light emission surface may have a circular shape or a hexagonal shape. The distance between adjacent light emitting devices 14 may be small. When the distance between adjacent light emitting devices 14 is small, the light outputted from the light emitting devices 14 are likely to be mixed with one another. Therefore, for example, even when the light emitting devices each output light having a small divergence angle, unevenness of the intensity across the cross section of the light outputted from the light source 10 can be reduced. Although not shown, adjacent light emitting devices 14 may be in contact with each other.

The light outputted from each of the light emitting devices 14 enters the corresponding lens 15. The lenses 15 are each, for example, a convex lens. The lenses can each reduce the divergence angle of the light outputted from the corresponding light emitting device 14. In the example shown in FIGS. 1 to 4, the plurality of lenses 15 form a lens array in which adjacent lenses 15 are connected to each other. The lenses 15 are made, for example, of glass.

Out of the plurality of light emitters 13, a first light emitter 13a, a second light emitter 13b, a third light emitter 13c, and a fourth light emitter 13d define a placement region 16, where fifth light emitters 13e out of the plurality of light emitters 13 are placed, as shown in FIG. 2. The placement region 16 is a region of the placement surface 11a.

In the example shown in FIG. 2, in a plan view viewed in the X-axis direction (hereinafter also referred to as "in the plan view"), the first light emitter 13a is a light emitter 13 including a first light emitting device 14a, which is one of the plurality of light emitting devices 14 and disposed in a position closest to both the +Y-axis-direction side and the +Z-axis-direction side. The second light emitter 13b is a light emitter 13 including a second light emitting device 14b, which is one of the plurality of light emitting devices 14 and disposed in a position closest to both the −Y-axis-direction side and the +Z-axis-direction side. The third light emitter 13c is a light emitter 13 including a third light emitting device 14c, which is one of the plurality of light emitting devices 14 and disposed in a position closest to both the −Y-axis-direction side and the −Z-axis-direction side. The fourth light emitter 13d is a light emitter 13 including a fourth light emitting device 14d, which is one of the plurality of light emitting devices 14 and disposed in a position closest to both the +Y-axis-direction side and the −Z-axis-direction side.

The ratio of the area (area in the plan view viewed in the X-axis direction) of each of the light emitting devices 14 to the area of the placement region 16 is, for example, 1/10 or smaller, preferably 1/100 or smaller, more preferably 1/1000 or smaller. The smaller the area ratio is, the more finely the cross-sectional shape and the intensity of the light outputted from the light source 10 can be controlled. In particular, a nano-column light emitting device, which allows a small area ratio, may be used as each of the light emitting device 14.

The placement region 16 is a rectangular region defined by a first side 16a, a second side 16b, a third side 16c, and a fourth side 16d in the plan view viewed in the direction of the normal P to the placement surface 11a (X-axis direction in example shown in FIGS. 1 to 4).

In the plan view, the first side 16a is a side that connects the first light emitter 13a to the second light emitter 13b. The second side 16b is a side that connects the second light emitter 13b to the third light emitter 13c. The third side 16c is a side that connects the third light emitter 13c to the fourth light emitter 13d. The fourth side 16d is a side that connects the fourth light emitter 13d to the first light emitter 13a. In the example shown in FIGS. 2 and 3, the light emitters 13 each have a rectangular shape in the plan view.

In the plan view, the first side 16a is a side that connects a center C1 of the first light emitter 13a to a center C2 of the second light emitter 13b. The second side 16b is a side that connects the center C2 of the second light emitter 13b to a center C3 of the third light emitter 13c. The third side 16c is a side that connects the center C3 of the third light emitter 13c to a center C4 of the fourth light emitter 13d. The fourth side 16d is a side that connects the center C4 of the fourth light emitter 13d to the center C1 of the first light emitter 13a. In the example shown in FIG. 2, the center C1 of the first light emitter 13a is the center of the first light emitting device 14a, the center C2 of the second light emitter 13b is the center of the second light emitting device 14b, the center C3 of the third light emitter 13c is the center of the third light emitting device 14c, and the center C4 of the fourth light emitter 13d is the center of the fourth light emitting device 14d. The light emitting devices 14 each have, for example, a rectangular shape in the plan view. In the plan view, the center of each of the light emitting devices 14 coincides, for example, with the center of the light emission surface of the light emitting device 14.

The center of a shape is the center of the minimum circle that encloses the shape (minimum enclosing circle). In the example shown in FIG. 2, the center of the first light emitting device 14a is the center of the minimum circle enclosing the first light emitting device 14a therein in the plan view. The center of the second light emitting device 14b is the center of the minimum circle enclosing the second light emitting device 14b therein in the plan view. The center of the third light emitting device 14c is the center of the minimum circle enclosing the third light emitting device 14c therein in the plan view. The center of the fourth light emitting device 14d is the center of the minimum circle enclosing the fourth light emitting device 14d therein in the plan view.

The fifth light emitters 13e are placed in the placement region 16. In the example shown in FIG. 2, at least part of the fifth light emitters 13e is placed in the placement region 16. The fifth light emitters 13e are placed in a plurality of positions.

Out of the plurality of fifth light emitters 13e, a sixth light emitter 13f is placed in a position closest to a middle point M1 of the first side 16a, In the example shown in FIG. 2, the sixth light emitter 13f is placed at the middle point M1. The sixth light emitter 13f includes a light emitting device 14 placed at the middle point M1.

Out of the plurality of fifth light emitters 13e, a seventh light emitter 13g is placed in a position closest to a center C of the placement region 16. In the example shown in FIG. 2, the seventh light emitter 13g is placed at the center C. The seventh light emitter 13g includes a light emitting device 14 placed at the center C.

Similarly, out of the plurality of fifth light emitters 13e, an eighth light emitter 13h, a ninth light emitter 13i, and a tenth light emitter 13j are placed in positions closest to a middle point M2 of the second side 16b, a middle point M3 of the third side 16c, and a middle point M4 of the fourth side 16d, respectively. In the example shown in FIG. 2, the light emitters 13h, 13i, and 13j are placed at the middle points M2, M3, and M4, respectively. The light emitters 13h, 13i, and 13j include light emitting devices 14 placed at the middle points M2, M3, and M4, respectively.

Figure 5:
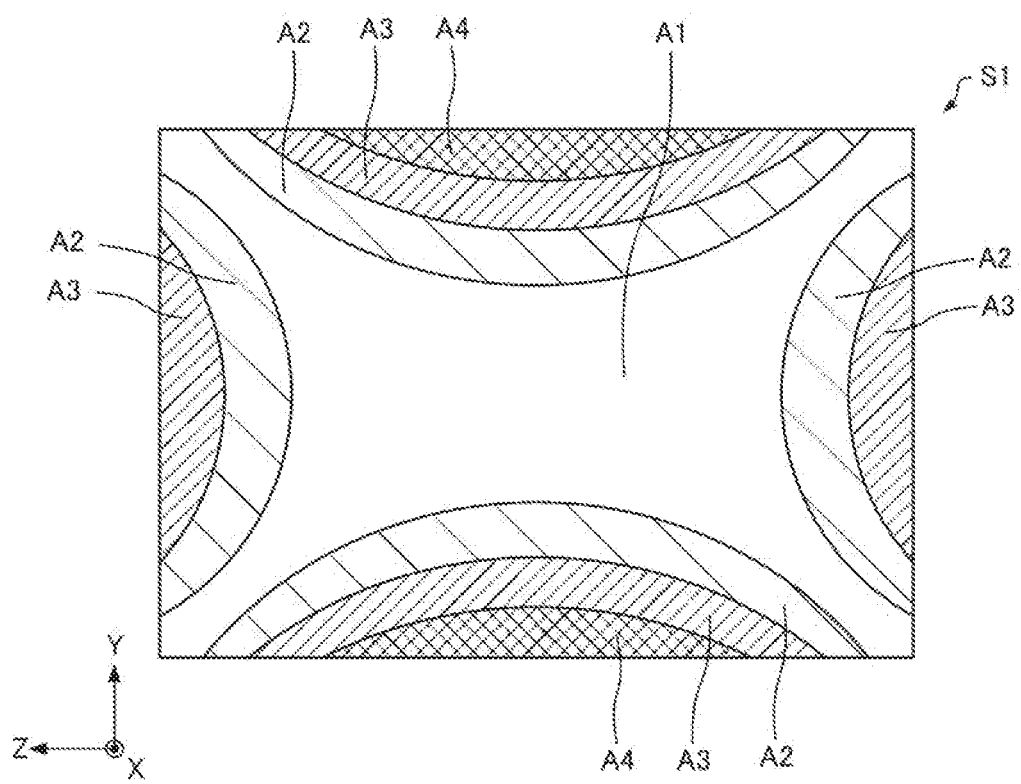
FIG. 5 describes the intensity distribution across a cross section of light.

FIG. 5 describes the intensity distribution across a cross section S1 of the light immediately after being outputted from the light source 10. The intensity distribution across the cross section S1 is, for example, the intensity distribution in a light emission region (in FIG. 4, the region that is part of a plane parallel to the plane YZ and is in contact with the +X-axis-direction-side end of the light source 10) 17 of the light source 10.

The cross section S1 of the light has, for example, a first region A1, a second region A2, where the intensity of the light is smaller than that in the first region A1, a third region A3, where the intensity of the light is smaller than that in the second region A2, and a fourth region A4, where the intensity of the light is smaller than that in the third region A3, as shown in FIG. 5. In the example shown in FIG. 5, the cross section S1 of the light has a rectangular shape. The regions A1, A2, A3, and A4 are, for example, symmetric with respect to an imaginary axis (not shown) passing through the center of the cross section S1 of the light and parallel to the axis Y and further symmetric with respect to an imaginary axis (not shown) passing through the center and parallel to the axis Z.

The intensities of the light outputted from the light emitter 13f, 13h, 13i, and 13j are smaller than the intensities of the light outputted from the light emitters 13a, 13b, 13c, 13d, and 13g, as shown in FIGS. 2 and 5. In the example shown in FIGS. 2 and 5, the light outputted from the light emitters 13a, 13b, 13c, 13d, and 13g primarily forms the first region A1. The light outputted from the light emitters 13f and 13i primarily forms the third region A3. The light outputted from the light emitters 13h and 13j primarily forms the fourth region A4.

Out of the plurality of fifth light emitters 13e, the fifth light emitters 13e arranged in a first direction (the −Y-axis direction in the example shown in FIG. 2) extending from the center C1 of the first light emitter 13a toward the middle point M1 output light having intensities that decrease with distance toward the −Y-axis-direction side between the first light emitter 13a and the sixth light emitter 13f.

Out of the plurality of fifth light emitters 13e, the fifth light emitters 13e arranged in a second direction (the +Y-axis direction in the example shown in FIG. 2) extending from the center C2 of the second light emitter 13b toward the middle point M1 output light having intensities that decrease with distance toward the +Y-axis-direction side between the second light emitter 13b and the sixth light emitter 13f.

Out of the plurality of fifth light emitters 13e, the fifth light emitters 13e arranged in a third direction (the −Z-axis direction in the example shown in FIG. 2) extending from the middle point M1 toward the center C output light having intensities that increase with distance toward the −Z-axis-direction side between the sixth light emitter 13f and the seventh light emitter 13g.

The light source 10 may be so configured that among the plurality of fifth light emitters 13e arranged in the −Y-axis direction between the first light emitter 13a and the sixth light emitter 13f, adjacent fifth light emitters 13e may output light having the same intensity. The same holds true for the fifth light emitters 13e between the second light emitter 13b and the sixth light emitter 13f and the fifth light emitters 13e between the sixth light emitter 13f and the seventh light emitter 13g.

Further, each of the fifth light emitters 13e arranged in the −Y-axis direction between the first light emitter 13a and the sixth light emitter 13f may output light having intensities that gradually decrease with distance toward the −Y-axis-direction side. The same holds true for the fifth light emitters 13e between the second light emitter 13b and the sixth light emitter 13f and the fifth light emitters 13e between the sixth light emitter 13f and the seventh light emitter 13g.

Out of the plurality of fifth light emitters 13e, the fifth light emitters 13e arranged in the third direction (the −Z-axis direction in the example shown in FIG. 2) extending from the center C2 of the second light emitter 13b toward the middle point M2 output light having intensities that decrease with distance toward the −Z-axis-direction side between the second light emitter 13b and the eighth light emitter 13h, as in the case of the first side 16a.

Out of the plurality of fifth light emitters 13e, the fifth light emitters 13e arranged in a fourth direction (the +Z-axis direction in the example shown in FIG. 2) extending from the center C3 of the third light emitter 13c toward the middle point M2 output light having intensities that decrease with distance toward the +Z-axis-direction side between the third light emitter 13c and the eighth light emitter 13h.

Out of the plurality of fifth light emitters 13e, the fifth light emitters 13e arranged in the second direction (the +Y-axis direction in the example shown in FIG. 2) extending from the middle point M2 toward the center C output light having intensities that increase with distance toward the +Y-axis-direction side between the eighth light emitter 13h and the seventh light emitter 13g.

Out of the plurality of fifth light emitters 13e, the fifth light emitters 13e arranged in the second direction (the +Y-axis direction in the example shown in FIG. 2) extending from the center C3 of the third light emitter 13c toward the middle point M3 output light having intensities that decrease with distance toward the +Y-axis-direction side between the third light emitter 13c and the ninth light emitter 13i.

Out of the plurality of fifth light emitters 13e, the fifth light emitters 13e arranged in the first direction (the −Y-axis direction in the example shown in FIG. 2) extending from the center C4 of the fourth light emitter 13d toward the middle point M3 output light having intensities that decrease with distance toward the −Y-axis-direction side between the fourth light emitter 13d and the ninth light emitter 13i.

Out of the plurality of fifth light emitters 13e, the fifth light emitters 13e arranged in the fourth direction (the +Z-axis direction in the example shown in FIG. 2) extending from the middle point M3 toward the center C output light having intensities that increase with distance toward the +Z-axis-direction side between the ninth light emitter 13i and the seventh light emitter 13g.

Out of the plurality of fifth light emitters 13e, the fifth light emitters 13e arranged in the fourth direction (the +Z-axis direction in the example shown in FIG. 2) extending from the center C4 of the fourth light emitter 13d toward the middle point M4 output light having intensities that decrease with distance toward the +Z-axis-direction side between the fourth light emitter 13d and the tenth light emitter 13j.

Out of the plurality of fifth light emitters 13e, the fifth light emitters 13e arranged in the third direction (the −Z-axis direction in the example shown in FIG. 2) extending from the center C1 of the first light emitter 13a toward the middle point M4 output light having intensities that decrease with distance toward the −Z-axis-direction side between the first light emitter 13a and the tenth light emitter 13j.

Out of the plurality of fifth light emitters 13e, the fifth light emitters 13e arranged in the first direction (the −Y-axis direction in the example shown in FIG. 2) extending from the middle point M4 toward the center C output light having intensities that increase with distance toward the −Y-axis-direction side between the tenth light emitter 13j and the seventh light emitter 13g.

The light outputted from the light source 10 is incident on the liquid crystal light valve 20, as shown in FIG. 1. In the example shown in FIG. 1, the first polarizer is provided on the light incident side of the liquid crystal light valve 20, and the second polarizer 32 is provided on the light exiting side of the liquid crystal light valve 20. The first polarizer 30 aligns the polarization directions of the light incident on the liquid crystal light valve 20 with one another. The second polarizer 32 aligns the polarization directions of the light outputted from the liquid crystal light valve 20 with one another.

Figure 6:
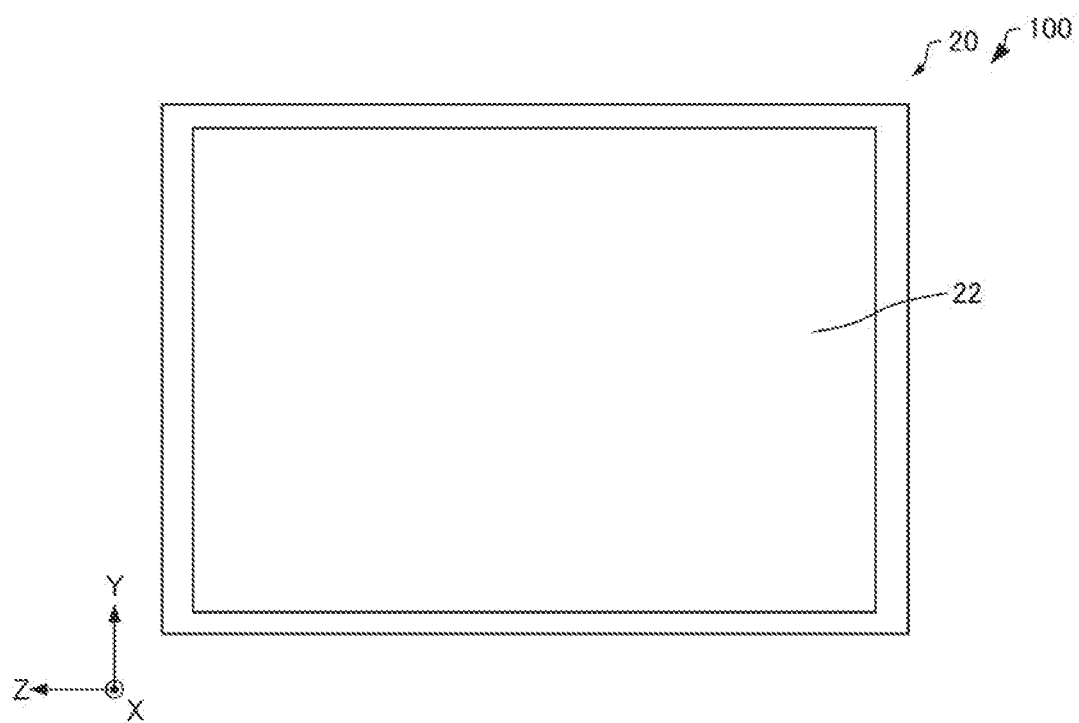
FIG. 6 is a plan view diagrammatically showing a light modulator of the projector according to the embodiment.

The liquid crystal light valve 20 has a display region 22, which modulates the light outputted from the light source 10 in accordance with image information. FIG. 6 is a plan view diagrammatically showing the liquid crystal light valve 20.

The display region 22 has a rectangular shape in the plan view, as shown in FIG. 6. The display region 22 is, for example, an image forming region. The display region 22 is formed, for example, of a liquid crystal layer. In the plan view, the shape of the light emission region 17 (cross-sectional shape in plane YZ) may be similar to the shape of the display region 22, and the size of the light emission region 17 may be equal to or slightly greater than the size of the display region 22. The display region 22 can therefore be illuminated with light having small intensity unevenness. The liquid crystal light valve 20 is, for example, a transmissive light valve that transmits light.

The shape of the light on the display region 22 of the liquid crystal light valve 20 is closer to a rectangular shape than, for example, in the case of a light source in which a plurality of light emitting devices are arranged in a rectangular placement region and all the light emitting devices output light having the same intensity.

The light outputted from the liquid crystal light valve 20 enters the projection apparatus 40. The projection apparatus 40 enlarges an image formed by the liquid crystal light valve 20 and projects the image on a screen 50. The projection apparatus 40 is, for example, a projection lens.

The projector 100, for example, has the following features.

In the projector 100, out of the plurality of fifth light emitters 13e, the intensity of the light outputted from the sixth light emitter 13f placed in the position closest to the middle point M1 of the first side 16a is smaller than the intensity of the light outputted from the first light emitter 13a and the intensity of the light outputted from the second light emitter 13b. Further, out of the plurality of fifth light emitters 13e, the fifth light emitters 13e arranged in the first direction extending from the center C1 of the first light emitter 13a toward the middle point M1 of the first side 16a output light having intensities that decrease with distance toward the positive side in the first direction between the first light emitter 13a and the sixth light emitter 13f. Moreover, out of the plurality of fifth light emitters 13e, the fifth light emitters 13e arranged in the second direction extending from the center C2 of the second light emitter 13b toward the middle point M1 of the first side 16a output light having intensities that decrease with distance toward the positive side in the second direction between the second light emitter 13b and the sixth light emitter 13f.

Figure 7:
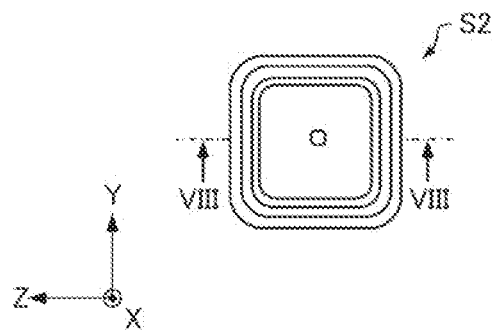
FIG. 7 describes the intensity distribution across a cross section of light.

Therefore, in the projector 100, for example, in the display region 22 of the liquid crystal light valve 20 placed in a position separate from the light source 10 by a predetermined distance, a cross section S2 of the light outputted from the light source 10 can have a roughly rectangular shape, as shown in FIG. 7. Therefore, in the projector 100, for example, the cross-sectional shape of the light (light outputted from light source 10) in the display region 22 can be a roughly rectangular shape in accordance with the rectangular display region 22 of the liquid crystal light valve 20, whereby the display region can be efficiently irradiated. Therefore, in the projector 100, for example, the simple, compact illumination system can provide high illumination efficiency and excellent illumination quality with use of no complicated optical system, such as an optical integrator.

Figure 9:
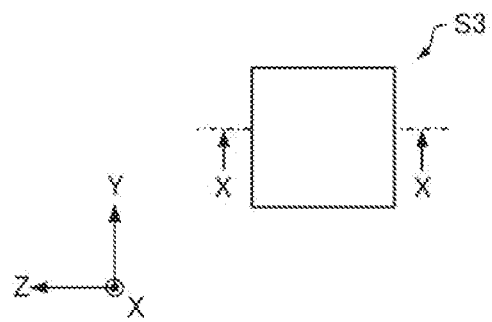
FIG. 9 describes the intensity distribution across a cross section of light.

On the other hand, when all light emitters output light having the same intensity, a cross section S3 of the light immediately after being outputted from the light source has, for example, a rectangular shape, as shown in FIG. 9. However, the light outputted from the light source is divergent and therefore diverges with distance from the light source, and the shape of a cross section S4 of the light in a position separate by the same distance as the distance between the light source 10 and the display region 22 in the case of the projector 100 is a circular shape, as shown, for example, in FIG. 11. In this case, since the cross-sectional shape of the light does not accord with the rectangular display region 22 of the liquid crystal light valve 20, resulting in a decrease in the efficiency of the amount of light with which the display region 22 is illuminated.

Figure 8:
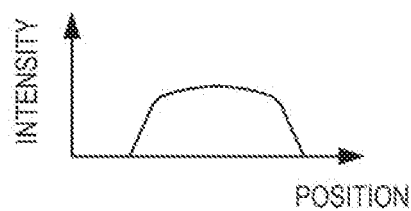
FIG. 8 describes the intensity distribution of the light.
Figure 10:
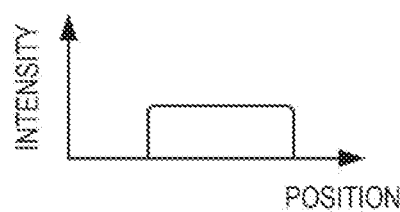
FIG. 10 describes the intensity distribution of the light.
Figure 11:
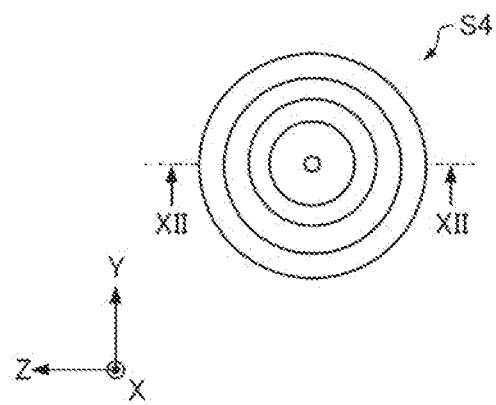
FIG. 11 describes the intensity distribution across a cross section of the light.
Figure 12:
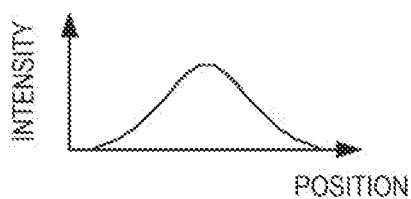
FIG. 12 describes the intensity distribution of the light.

FIGS. 7, 9, and 11 describe the intensity distributions across the cross sections S2, S3, and S4 of the light, and points having the same intensity are connected to each other into a line. FIG. 8 describes the optical intensity distribution across the cross section taken along the line VIII-VIII in FIG. 7. FIG. 10 describes the optical intensity distribution across the cross section taken along the line X-X in FIG. 9. FIG. 12 describes the optical intensity distribution across the cross section taken along the line XII-XII in FIG. 11. FIGS. 7 to 12 each show for convenience a case where the cross-sectional shape of the light immediately after being outputted from the light source is a square shape (square outer shape of light emission region 17 of light source 10). In FIGS. 7, 9, and 11, axes X, Y, and Z are drawn as three axes perpendicular to one another.

Further, for example, even the light having the shape shown in FIG. 7 on the display region 22 of the liquid crystal light valve 20 has the shape shown in FIG. 11 in a position sufficiently separate from the display region 22 in the +X-axis direction.

In the projector 100, out of the plurality of fifth light emitters 13e, the intensity of the light outputted from the seventh light emitter 13g placed in the position closest to the center C of the placement region 16 is greater than the intensity of the light outputted from the sixth light emitter 13f. Further, out of the plurality of fifth light emitters 13e, the fifth light emitters 13e arranged in the third direction extending from the middle point M1 of the first side 16a toward the center C of the placement region 16 output light having intensities that increase with distance toward the positive side in the third direction between the sixth light emitter 13f and the seventh light emitter 13g. Therefore, in the projector 100, the cross-sectional shape of the light outputted from the light source 10 can be more reliably a roughly rectangular shape on the display region 22.

In the projector 100, the light emitters 13 each include one light emitting device 14. Therefore, in the projector 100, the intensity of the light outputted from each of the plurality of light emitters 13 can be controlled, for example, by controlling the amount of current injected to the corresponding light emitting device 14.

In the projector 100, the shape of the light on the display region 22 is closer to a rectangular shape than in the case of a light source in which a plurality of light emitting devices are arranged in a rectangular placement region and all the light emitting devices output light having the same intensity. Therefore, in the projector 100, the display region 22 of the liquid crystal light valve 20 can be efficiently illuminated. For example, when a line representing the same intensity has a linear portion, as shown in FIG. 7, it can be said that the cross-sectional shape in the case described above is closer to a rectangular shape than a case where a line representing the same intensity forms a circle, as shown in FIG. 11. Further, for example, the longer the linear portion of the line representing the same intensity is, the closer to a rectangular shape the cross-sectional shape is.

In the projector 100, out of the plurality of fifth light emitters 13e, the intensity of the light outputted from the eighth light emitter 13h placed in the position closest to the middle point M2 of the second side 16b is smaller than the intensity of the light outputted from the second light emitter 13b and the intensity of the light outputted from the third light emitter 13c. Further, out of the plurality of fifth light emitters 13e, the fifth light emitters 13e arranged in the third direction extending from the center C2 of the second light emitter 13b toward the middle point M2 of the second side 16b output light having intensities that decrease with distance toward the positive side in the third direction between the second light emitter 13b and the eighth light emitter 13h. Moreover, out of the plurality of fifth light emitters 13e, the fifth light emitters 13e arranged in the fourth direction extending from the center C3 of the third light emitter 13c toward the middle point M2 of the second side 16b output light having intensities that decrease with distance toward the positive side in the fourth direction between the third light emitter 13c and the eighth light emitter 13h. Therefore, in the projector 100, the cross-sectional shape of the light outputted from the light source 10 can be more reliably a roughly rectangular shape on the display region 22.

In the projector 100, out of the plurality of fifth light emitters 13e, the intensity of the light outputted from the ninth light emitter 13i placed in the position closest to the middle point M3 of the third side 16c is smaller than the intensity of the light outputted from the third light emitter 13c and the intensity of the light outputted from the fourth light emitter 13d. Further, out of the plurality of fifth light emitters 13e, the fifth light emitters 13e arranged in the second direction extending from the center C3 of the third light emitter 13c toward the middle point M3 of the third side 16c output light having intensities that decrease with distance toward the positive side in the second direction between the third light emitter 13c and the ninth light emitter 13i. Moreover, out of the plurality of fifth light emitters 13e, the fifth light emitters 13e arranged in the first direction extending from the center C4 of the fourth light emitter 13d toward the middle point M3 of the third side 16c output light having intensities that decrease with distance toward the positive side in the first direction between the fourth light emitter 13d and the ninth light emitter 13i. Therefore, in the projector 100, the cross-sectional shape of the light outputted from the light source 10 can be more reliably a roughly rectangular shape on the display region 22.

In the projector 100, out of the plurality of fifth light emitters 13e, the intensity of the light outputted from the tenth light emitter 13j placed in the position closest to the middle point M4 of the fourth side 16d is smaller than the intensity of the light outputted from the fourth light emitter 13d and the intensity of the light outputted from the first light emitter 13a. Further, out of the plurality of fifth light emitters 13e, the fifth light emitters 13e arranged in the fourth direction extending from the center C4 of the fourth light emitter 13d toward the middle point M4 of the fourth side 16d output light having intensities that decrease with distance toward the positive side in the fourth direction between the fourth light emitter 13d and the tenth light emitter 13j. Moreover, out of the plurality of fifth light emitters 13e, the fifth light emitters 13e arranged in the third direction extending from the center C1 of the first light emitter 13a toward the middle point M4 of the fourth side 16d output light having intensities that decrease with distance toward the positive side in the third direction between the first light emitter 13a and the tenth light emitter 13j. Therefore, in the projector 100, the cross-sectional shape of the light outputted from the light source 10 can be more reliably a roughly rectangular shape on the display region 22.

Although not shown, the projector according to the embodiment of the present disclosure, may include three light sources that output red light, green light, and blue light, three liquid crystal light valves corresponding to the light sources, and a cross dichroic prism that combines the light outputted from the liquid crystal light valves with one another.

2. Variations of Projector 2.1. First Variation

Figure 13:
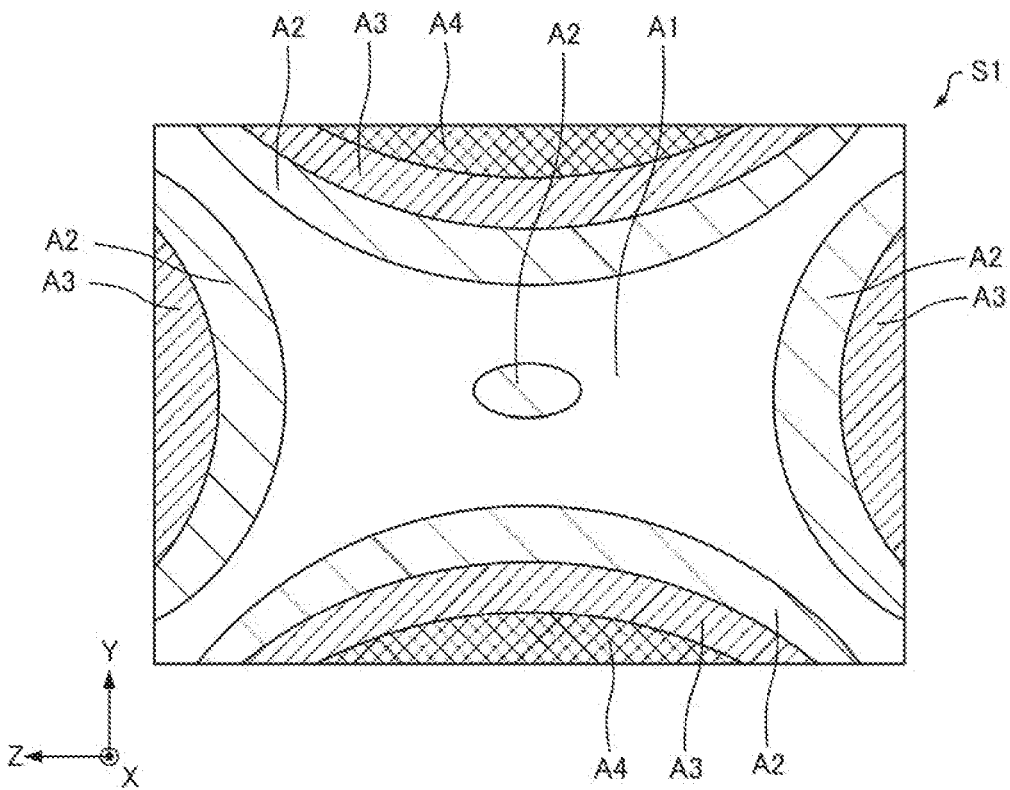
FIG. 13 describes the intensity distribution across a cross section of light.

A projector according to a first variation of the present embodiment will next be described with reference to the drawings. FIG. 13 describes the intensity distribution across the cross section S1 of the light immediately after being outputted from the light source 10 in the projector according to the first variation of the present embodiment. In FIG. 13 and in FIG. 14, which will be described later, axes X, Y, and Z are drawn as three axes perpendicular to one another.

The following description of the projector according to the first variation of the present embodiment will be made of points different from those in the case of the projector 100 according to the present embodiment described above. The same holds true for projectors according to second and third variations of the present embodiment described later.

In the projector 100, the intensity of the light outputted from the seventh light emitter 13g is equal to the intensity of the light outputted from each of the light emitters 13a, 13b, 13c, and 13d, as shown in FIGS. 2 and 5.

In contrast, in the projector according to the first variation of the present embodiment (hereinafter also referred to as "first-variation projector"), the intensity of the light outputted from the seventh light emitter 13g is smaller than the intensity of the light outputted from each of the light emitters 13a, 13b, 13c, and 13d, as shown in FIG. 13. In the example shown in FIG. 13, the light outputted from the seventh light emitter 13g is light that primarily forms the second region A2.

The first-variation projector, for example, has the following features.

In the first-variation projector, the intensity of the light outputted from the seventh light emitter 13g is smaller than the intensity of the light outputted from the first light emitter 13a and the intensity of the light outputted from the second light emitter 13b. Therefore, even in a case where the first-variation projector includes light emitters 13 that each output divergent light, the first-variation projector can prevent the intensity at the center of the cross section of the light outputted from the light source 10 from being too large. Therefore, in the first-variation projector, the light outputted from the light source 10 has a more uniform intensity distribution as shown in FIGS. 14 and 15 on the display region 22 of the liquid crystal light valve 20 than, for example, the projector 100.

Figure 14:
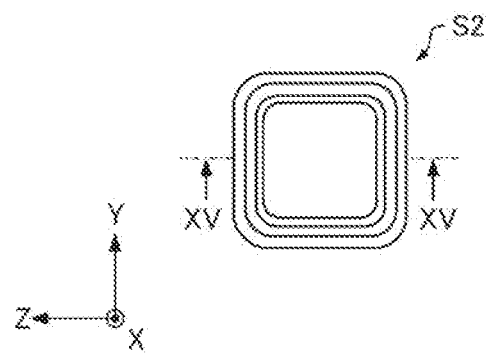
FIG. 14 describes the intensity distribution across the cross section of the light.
Figure 15:
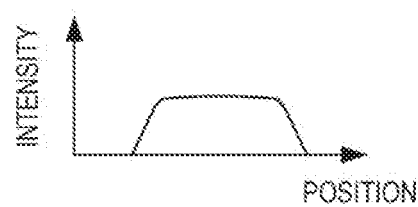
FIG. 15 describes the intensity distribution of the light.

FIG. 14 describes the optical intensity distribution across the cross section S2, and points having the same intensity are connected to each other into a line. FIG. 15 describes the optical intensity distribution across the cross section taken along the line XV-XV in FIG. 14. FIGS. 14 and 15 each show for convenience the case where the cross-sectional shape of the light immediately after being outputted from the light source is a square shape (square outer shape of light emission region 17 of light source 10).

Further, for example, in the plan view, a center portion of the projection apparatus 40, which is the projection lens, transmits light at high transmittance, as compared with a peripheral portion of the projection apparatus 40. In the first-variation projector, the intensity unevenness of the light projected by the projection apparatus 40 having the characteristic described above can be reduced.

2.2. Second Variation

Figure 16:
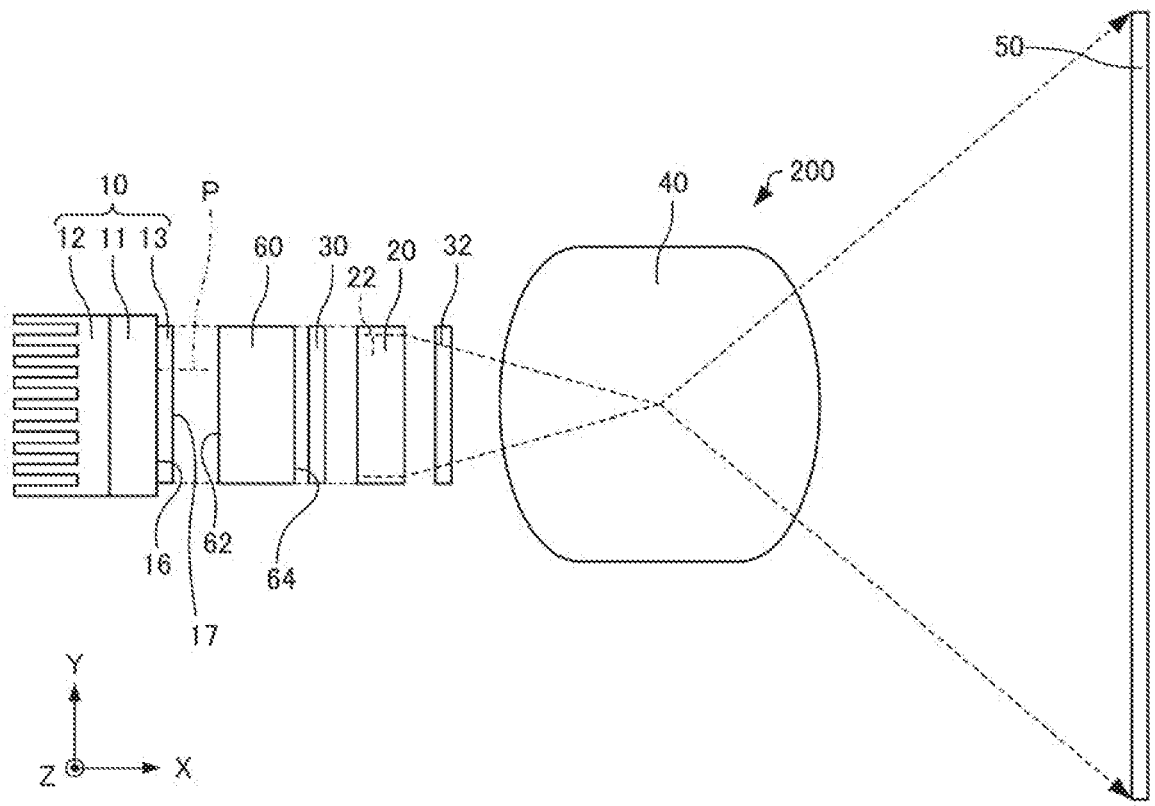
FIG. 16 diagrammatically shows a projector according to a second variation of the embodiment.

A projector according to a second variation of the present embodiment will next be described with reference to the drawings. FIG. 16 diagrammatically shows a projector 200 according to the second variation of the present embodiment. In FIG. 16, the light emitters 13 are drawn in a simplified form for convenience. In FIG. 16, axes X, Y, and Z are drawn as three axes perpendicular to one another.

The projector 200 differs from the projector 100 described above in that the projector 200 includes a light guide element 60, which guides the light outputted from the light source 10 to the display region 22, as shown in FIG. 16.

Figure 17:
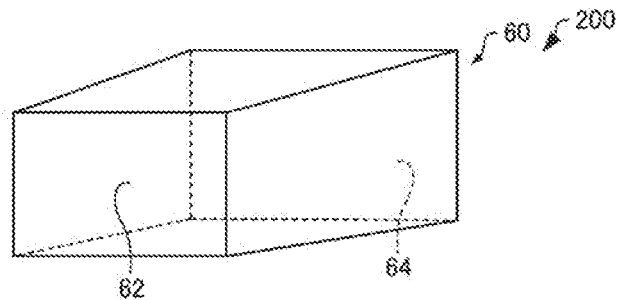
FIG. 17 is a perspective views diagrammatically showing a light guide element of the projector according to the second variation of the embodiment.
Figure 18:
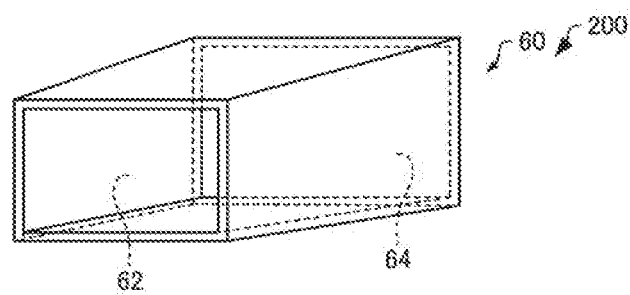
FIG. 18 is a perspective views diagrammatically showing another light guide element of the projector according to the second variation of the embodiment.

The light guide element 60 is placed between the light source 10 and the liquid crystal light valve 20. FIGS. 17 and 18 are perspective views diagrammatically showing the light guide element 60. The light guide element 60 may be a rod-shaped element made of a light transmissive medium, such as glass, as shown in FIG. 17. The light guide element 60 may instead be a tubular element having an internal space defined by reflection mirrors so placed as to form a tube, as shown in FIG. 18. The light guide element 60 may be so tapered that the cross-sectional area thereof increases in the direction from a light incident surface 62 toward a light exiting surface 64, as shown in FIGS. 17 and 18.

The light incident surface 62 and the light exiting surface 64 of the light guide element 60 each have, for example, a rectangular shape. The shape of the light incident surface 62 (cross-sectional shape in plane YZ) is preferably roughly similar to the shape of the light emission region 17 of the light source 10, and the size of the light incident surface 62 is preferably equal to or slightly greater than the size of the light emission region 17. The amount of light that is not incident on the light incident surface 62 and is therefore lost can therefore be reduced. The shape of the light exiting surface 64 (cross-sectional shape in plane YZ) is preferably roughly similar to the shape of the display region 22, and the size of the light exiting surface 64 is preferably equal to or slightly greater than the size of the display region 22. The display region 22 can therefore be illuminated with light having a small amount of intensity unevenness. The light guide element 60 has, for example, a rectangular shape in the plan view.

The shape of the light on the light incident surface 62 of the light guide element 60 is closer to a rectangular shape than in the case of a light source in which a plurality of light emitting devices are arranged in a rectangular placement region and all the light emitting devices output light having the same intensity.

The projector 200, for example, has the following features.

The projector 200 includes the light guide element 60, which guides the light outputted from the light source 10 to the display region 22, and the shape of the light on the light incident surface 62 of the light guide element 60 is closer to a rectangular shape than in the case of a light source in which a plurality of light emitting devices are arranged in a rectangular placement region and all the light emitting devices output light having the same intensity. Therefore, in the projector 200, the light can enter the light guide element 60 at improved efficiency, whereby the display region 22 of the liquid crystal light valve 20 can be efficiently illuminated. Further, since the projector 200 includes the light guide element 60, the display region 22 can be illuminated with light having a smaller amount of intensity unevenness.

2.3. Third Variation

Figure 19:
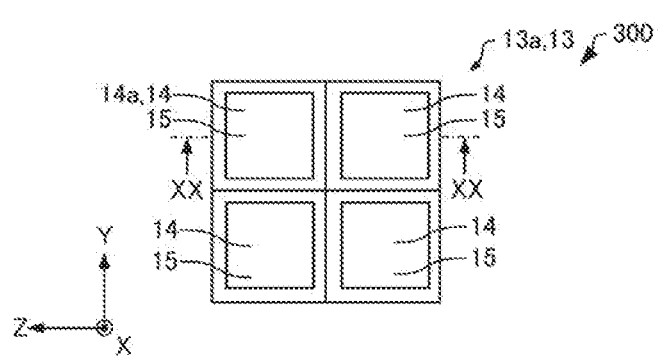
FIG. 19 is a plan view diagrammatically showing a light emitter of a projector according to a third variation of the embodiment.
Figure 20:
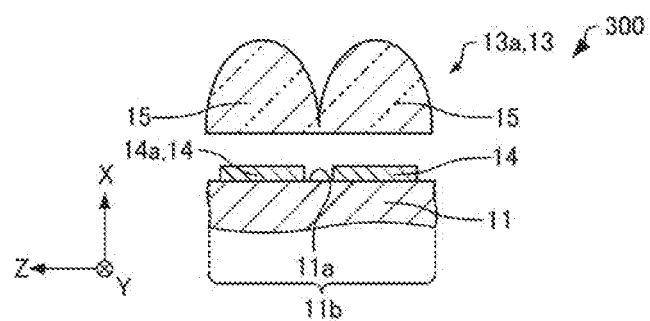
FIG. 20 is a cross-sectional view diagrammatically showing the light emitter of the projector according to the third variation of the embodiment.
Figure 21:
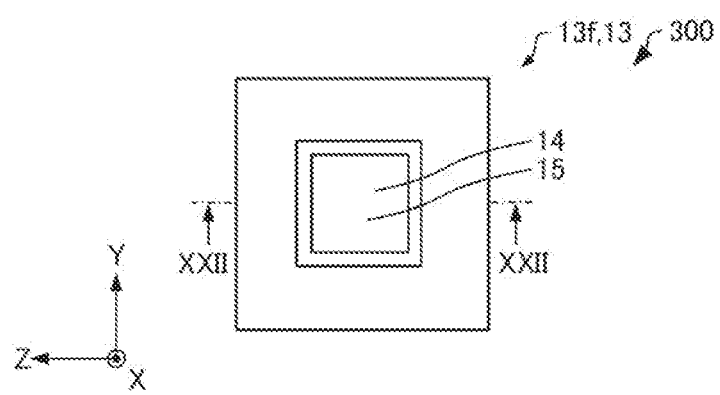
FIG. 21 is a plan view diagrammatically showing another light emitter of the projector according to the third variation of the embodiment.
Figure 22:
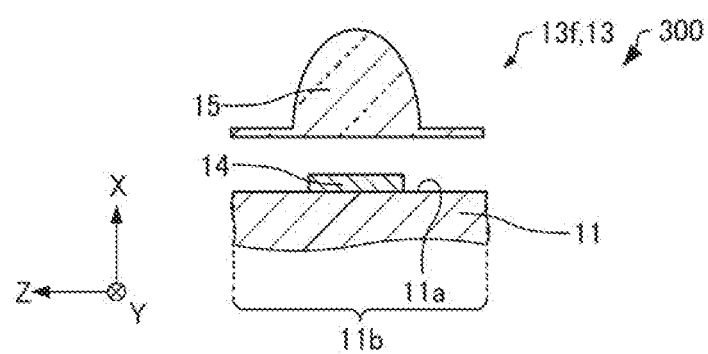
FIG. 22 is a cross-sectional view diagrammatically showing the other light emitter of the projector according to the third variation of the embodiment.

A projector according to a third variation of the present embodiment will next be described with reference to the drawings. FIG. 19 is a plan view diagrammatically showing a light emitter 13 of a projector 300 according to the third variation of the present embodiment. FIG. 20 is a cross-sectional view taken along the line XX-XX in FIG. 19 and diagrammatically showing the light emitter 13 of the projector 300 according to the third variation of the present embodiment. FIG. 21 is a plan view diagrammatically showing another light emitter 13 of the projector 300 according to the third variation of the present embodiment. FIG. 22 is a cross-sectional view taken along the line XXII-XXII in FIG. 21 and diagrammatically showing the other light emitter 13 of the projector 300 according to the third variation of the present embodiment.

FIGS. 19 and 20 show the first light emitter 13a of the projector 300. FIGS. 21 and 22 show the sixth light emitter 13f of the projector 300. In FIGS. 19 to 22, axes X, Y, and Z are drawn as three axes perpendicular to one another.

In the projector 100 described above, the light emitters 13 each include only one light emitting device 14, as shown in FIGS. 3 and 4. In contrast, in the projector 300, the light emitters 13 each include one or more light emitting devices 14, as shown in FIGS. 19 to 22. In the projector 300, for example, all the light emitting devices 14 output light having the same intensity.

In the projector 300, the number of light emitting devices 14 provided in the sixth light emitter 13f is smaller than the number of light emitting devices 14 provided in the first light emitter 13a. In the example shown in FIGS. 19 to 22, the first light emitter 13a includes four light emitting devices 14. The sixth light emitter 13f includes one light emitting device 14. Similarly, the number of light emitting devices 14 provided in each of the light emitters 13h, 13i and 13j is smaller than the number of light emitting devices 14 provided in each of the light emitters 13b, 13c, 13d, and 13g.

In the projector 300, the light emitters 13 each include, for example, one or more light emitting devices 14 placed in a region of the placement surface 11a that is a region having a predetermined area (predetermined-area region) and one or more lenses 15, on which the light outputted from the one or more light emitting devices 14 is incident.

For example, the first light emitter 13a includes four light emitting devices 14. In this case, the center C1 of the first light emitter 13a is the center of the minimum circle that encloses the centers of the four first light emitting devices 14a (minimum enclosing circle). The four first light emitting devices 14a are placed in the predetermined-area region 11b enclosing the center C1. The second light emitter 13b includes four second light emitting devices 14b. In this case, the center C2 of the second light emitter 13b is the center of the minimum circle that encloses the centers of the four second light emitting devices 14b (minimum enclosing circle). The four second light emitting devices 14b are placed in the predetermined-area region 11b enclosing the center C2. The sixth light emitter 13f includes one light emitting device 14 placed in the predetermined-area region 11b enclosing the middle point M1.

The plurality of predetermined-area regions 11b are placed in a two-dimensional array (in a matrix). The predetermined-area regions 11b each have, for example, a rectangular (square, for example) shape. The predetermined area regions 11b each have, for example, an area of 1 μm² or greater.

The projector 300 can control the number of light emitting devices 14 placed per predetermined-area region 11b (control the density of the light emitting devices 14 placed on the placement surface 11) to achieve the intensity distribution of the light immediately after being outputted from the light source 10 shown in FIG. 5.

The projector 300, for example, has the following features.

In the projector 300, the light emitters 13 each include one or more light emitting devices 14, with the number of light emitting devices 14 provided in the sixth light emitter 13f being smaller than the number of light emitting devices 14 provided in the first light emitter 13a and the number of light emitting devices 14 provided in the second light emitter 13b, and the intensity of the light outputted from each of the light emitting devices 14 provided in the first light emitter 13a, the intensity of the light outputted from each of the light emitting devices provided in the second light emitter 13b, and the intensity of the light outputted from the light emitting device 14 provided in the sixth light emitter 13f being equal to one another. Therefore, in the projector 300, the light outputted from the light source 10 can have a roughly rectangular shape on the display region 22 even when the projector 300 includes a plurality of light emitting devices 14 that output light having the same intensity.

In the present disclosure, part of the configuration thereof may be omitted and the embodiment and variations may be combined with each other to the extent that the features and effects described in the present application are provided.

The present disclosure encompasses substantially the same configuration as the configuration described in the embodiment (for example, a configuration having the same function, using the same method, and providing the same result or a configuration having the same purpose and providing the same effect). Further, the present disclosure encompasses a configuration in which an inessential portion of the configuration described in the embodiment is replaced. Moreover, the present disclosure encompasses a configuration that provides the same advantageous effects as those provided by the configuration described in the embodiment or a configuration that can achieve the same purpose as that achieved by the configuration described in the embodiment. Further, the present disclosure encompasses a configuration in which a known technology is added to the configuration described in the embodiment.

What is claimed is:

1. A projector comprising:
  a light source having a placement surface on which a plurality of light emitters are placed, the light emitters including a first light emitter, a second light emitter, a third light emitter, a fourth light emitter, and a plurality of fifth light emitters; and
  a light modulator having a rectangular display region that modulates light outputted from the light source in accordance with image information,
  wherein
  the first through fourth light emitters define a placement region where the fifth light emitters are placed,
  in a plan view viewed in a direction of a normal to the placement surface, the placement region is a rectangular region defined by
    a first side that connects a first center of the first light emitter to a second center of the second light emitter,
    a second side that connects the second center to a third center of the third light emitter,
    a third side that connects the third center to a fourth center of the fourth light emitter, and
    a fourth side that connects the fourth center to the first center,
  the fifth light emitters include:
    a sixth light emitter placed in a position closest to a middle point of the first side, the sixth light emitter outputting light with an intensity smaller than an intensity of light outputted from the first light emitter and smaller than an intensity of light outputted from the second light emitter,
    first portion light emitters arranged in a first direction extending from the center of the first light emitter toward the middle point of the first side, the first portion light emitters between the first light emitter and the sixth light emitter outputting light of less intensity with distance in the first direction, and second portion light emitters arranged in a second direction extending from the center of the second light emitter toward the middle point of the first side, the second portion light emitters between the second light emitter and the sixth light emitter outputting light of less intensity with distance in the second direction, wherein the light emitters each include one or more light emitting devices, the number of light emitting devices provided in the sixth light emitter is smaller than the number of light emitting devices provided in the first light emitter and the number of light emitting devices provided in the second light emitter, and an intensity of light outputted from each of the light emitting devices provided in the first light emitter, an intensity of light outputted from each of the light emitting devices provided in the second light emitter, and an intensity of light outputted from each of the light emitting devices provided in the sixth light emitter are equal to one another.

2. The projector according to claim 1, wherein the fifth light emitters include:
a seventh light emitter placed in a position closest to a center of the placement region, the seventh light emitter outputting light with an intensity greater than an intensity of light outputted from the sixth light emitter, and
third portion light emitters arranged in a third direction extending from the middle point of the first side toward the center of the placement region, the third portion light emitters between the sixth light emitter and the seventh light emitter outputting light of more intensity with distance in the third direction.

3. The projector according to claim 2, wherein the intensity of the light outputted from the seventh light emitter is smaller than the intensity of the light outputted from the first light emitter and the intensity of the light outputted from the second light emitter.

4. The projector according to claim 1, wherein a shape of the light on the display region is close to a rectangular shape.

5. The projector according to claim 1, further comprising a light guide element that guides the light outputted from the light source to the display region,
wherein a shape of the light on a light incident surface of the light guide element is close to a rectangular shape.

6. The projector according to claim 1, wherein the fifth light emitters include:
an eighth light emitter placed in a position closest to a middle point of the second side, the eighth light emitter outputting light with an intensity smaller than the intensity of light outputted from the second light emitter and smaller than the intensity of light outputted from the third light emitter,
fourth portion light emitters arranged in a third direction extending from the center of the second light emitter toward the middle point of the second side, the fourth portion light emitters between the second light emitter and the eighth light emitter outputting light of less intensity with distance in the third direction, and
fifth portion light emitters arranged in a fourth direction extending from the center of the third light emitter toward the middle point of the second side, the fifth portion light emitters between the third light emitter and the eighth light emitter outputting light of less intensity with distance in the fourth direction.

7. The projector according to claim 6, wherein the fifth light emitters include:
a ninth light emitter placed in a position closest to a middle point of the third side, the ninth light emitter outputting light with an intensity smaller than the intensity of light outputted from the third light emitter and smaller than the intensity of light outputted from the fourth light emitter,
sixth portion light emitters arranged in the second direction extending from the center of the third light emitter toward the middle point of the third side, the sixth portion light emitters between the third light emitter and the ninth light emitter outputting light of less intensity with distance in the second direction, and
seventh portion light emitters arranged in the first direction extending from the center of the fourth light emitter toward the middle point of the third side, the seventh portion light emitters between the fourth light emitter and the ninth light emitter outputting light of less intensity with distance in the first direction.

8. The projector according to claim 7, wherein the fifth light emitters include:
a tenth light emitter placed in a position closest to a middle point of the fourth side, the tenth light emitter outputting light with an intensity smaller than the intensity of light outputted from the fourth light emitter and smaller than the intensity of light outputted from the first light emitter,
eighth portion light emitters arranged in the fourth direction extending from the center of the fourth light emitter toward the middle point of the fourth side, the eighth portion light emitters between the fourth light emitter and the tenth light emitter outputting light of less intensity with distance in the fourth direction, and
ninth portion light emitters arranged in the third direction extending from the center of the first light emitter toward the middle point of the fourth side, the ninth portion light emitters between the first light emitter and the tenth light emitter outputting light of less intensity with distance in the third direction.

9. A projector comprising:
a light source having a placement surface on which a plurality of light emitters are placed, the light emitters including a first light emitter, a second light emitter, a third light emitter, a fourth light emitter, and a plurality of fifth light emitters; and
a light modulator having a rectangular display region that modulates light outputted from the light source in accordance with image information,
wherein the first through fourth light emitters define a placement region where the fifth light emitters are placed,
in a plan view viewed in a direction of a normal to the placement surface, the placement region is a rectangular region defined by
a first side that connects a first center of the first light emitter to a second center of the second light emitter,
a second side that connects the second center to a third center of the third light emitter,
a third side that connects the third center to a fourth center of the fourth light emitter, and a fourth side that connects the fourth center to the first center, the fifth light emitters include:
- a sixth light emitter placed in a position closest to a middle point of the first side, the sixth light emitter outputting light with an intensity smaller than an intensity of light outputted from the first light emitter and smaller than an intensity of light outputted from the second light emitter,
- first portion light emitters arranged in a first direction extending from the center of the first light emitter toward the middle point of the first side, the first portion light emitters between the first light emitter and the sixth light emitter outputting light of less intensity with distance in the first direction, and
- second portion light emitters arranged in a second direction extending from the center of the second light emitter toward the middle point of the first side, the second portion light emitters between the second light emitter and the sixth light emitter outputting light of less intensity with distance in the second direction, and wherein an intensity of light outputted from each of the plurality of light emitters is controlled by changing an amount of current injected into each of the plurality of light emitters.

\* \* \* \* \*